US012783564B2

(12) United States Patent
Bolcer et al.

(10) Patent No.: US 12,783,564 B2
(45) Date of Patent: Nov. 3, 2026

(54) GROUNDING LARGE LANGUAGE MODELS USING REAL-TIME CONTENT FEEDS AND REFERENCE DATA

(71) Applicant: Bitvore Corp., Los Angeles, CA (US)

(72) Inventors: Gregory Alan Bolcer, Yorba Linda, CA (US); Rodrigo Silva Nader, Uberlândia (BR); Gabriel Luiz Freitas Almeida, Ribeirão Preto (BR)

(73) Assignee: BITVORE CORP., Los Angeles, CA (US)

( * ) Notice: Subject to any disclaimer, the term of this patent is extended or adjusted under 35 U.S.C. 154(b) by 0 days.

(21) Appl. No.: 18/465,677

(22) Filed: Sep. 12, 2023

(65) Prior Publication Data

US 2025/0086211 A1 Mar. 13, 2025

(51) Int. Cl.
*G06F 16/33* (2025.01)
*G06F 16/332* (2019.01)
*G06F 16/334* (2025.01)

(52) U.S. Cl.
CPC ...... *G06F 16/3344* (2019.01); *G06F 16/3325* (2019.01)

(58) Field of Classification Search
CPC ......................... G06F 16/3344; G06F 16/3325
USPC ......................................................... 707/769
See application file for complete search history.

(56) References Cited

U.S. PATENT DOCUMENTS

| | | | | |
|---|---|---|---|---|
| 11,699,026 B2 * | 7/2023 | McInerney | G06F 40/40 | 715/254 |
| 11,769,017 B1 * | 9/2023 | Gray | G06N 3/0455 | 704/9 |
| 11,860,914 B1 * | 1/2024 | Qadrud-Din | G06F 16/3329 | |
| 11,861,320 B1 * | 1/2024 | Gajek | G06F 40/289 | |
| 11,861,321 B1 * | 1/2024 | O'Kelly | G06F 16/33 | |
| 11,875,130 B1 * | 1/2024 | Bosnjakovic | G06N 3/0475 | |
| 11,968,088 B1 * | 4/2024 | Yan | G06F 40/30 | |
| 11,971,914 B1 * | 4/2024 | Watson | G06F 16/3347 | |
| 11,972,223 B1 * | 4/2024 | DeFoor | G06F 40/40 | |
| 12,073,180 B2 * | 8/2024 | Tunstall-Pedoe | G06F 40/279 | |
| 2020/0226475 A1 * | 7/2020 | Ma | G06F 40/30 | |
| 2021/0192140 A1 * | 6/2021 | Galley | H04L 51/42 | |
| 2023/0112921 A1 * | 4/2023 | Cai | G06F 8/34 | 717/104 |
| 2023/0119109 A1 * | 4/2023 | Choubey | G06F 18/2155 | 706/12 |
| 2023/0244938 A1 * | 8/2023 | Wei | G06N 3/045 | 706/25 |
| 2023/0316006 A1 * | 10/2023 | Tunstall-Pedoe | G06N 3/0442 | 704/9 |
| 2023/0326212 A1 * | 10/2023 | Chawda | G06V 10/82 | 382/103 |
| 2023/0394855 A1 * | 12/2023 | Xie | G06F 40/40 | |

(Continued)

*Primary Examiner* — Hicham Skhoun
(74) *Attorney, Agent, or Firm* — McAndrews Held & Malloy, Ltd.

(57) ABSTRACT

This disclosure describes a system and method, using one or more processors, for grounding large language models using real-time content feeds and reference data. The system is able to receive/generate queries, prompt an AI model and evaluate the answer given by the AI model. A hallucination score is generated according to the evaluation of the answer. According to the hallucination score, the AI model may be iteratively accessed to improve the truthfulness of the answer.

18 Claims, 4 Drawing Sheets

(56) References Cited

U.S. PATENT DOCUMENTS

| | | | | |
|---|---|---|---|---|
| 2024/0119220 | A1* | 4/2024 | Aggarwal | G06N 3/08 |
| 2024/0126794 | A1* | 4/2024 | Cook | H04L 51/02 |
| 2024/0184988 | A1* | 6/2024 | Sridhar | G06F 16/36 |
| 2025/0078818 | A1* | 3/2025 | Sridhar | G06N 3/047 |

* cited by examiner

| | object_name | count | confidence |
|---|---|---|---|
| 0 | Airbus SE | 484 | 0.945036 |
| 1 | Boeing Co | 183 | 0.892468 |
| 2 | Viasat Inc | 151 | 0.898618 |
| 3 | SkyWest Airlines Inc | 42 | 0.826718 |
| 4 | Pratt & Whitney Co | 41 | 0.728884 |
| 5 | Aemetis Inc | 32 | 0.739389 |
| 6 | Amazon Web Services Inc | 32 | 0.701151 |
| 7 | Chevron Corp | 28 | 0.744431 |
| 8 | Boeing Defense, Space & Security | 24 | 0.739134 |
| 9 | T-Mobile International | 23 | 0.639370 |

GROUNDING LARGE LANGUAGE MODELS USING REAL-TIME CONTENT FEEDS AND REFERENCE DATA

BACKGROUND

Limitations and disadvantages of the limited accuracy of results for large language models will become apparent to one of skill in the art, through comparison of such approaches with some aspects of the present method and system set forth in the remainder of this disclosure with reference to the drawings.

BRIEF SUMMARY

Systems and methods are provided for grounding large language models using real-time content feeds and reference data, substantially as illustrated by and/or described in connection with at least one of the figures, as set forth more completely in the claims.

DETAILED DESCRIPTION

Figure 1:
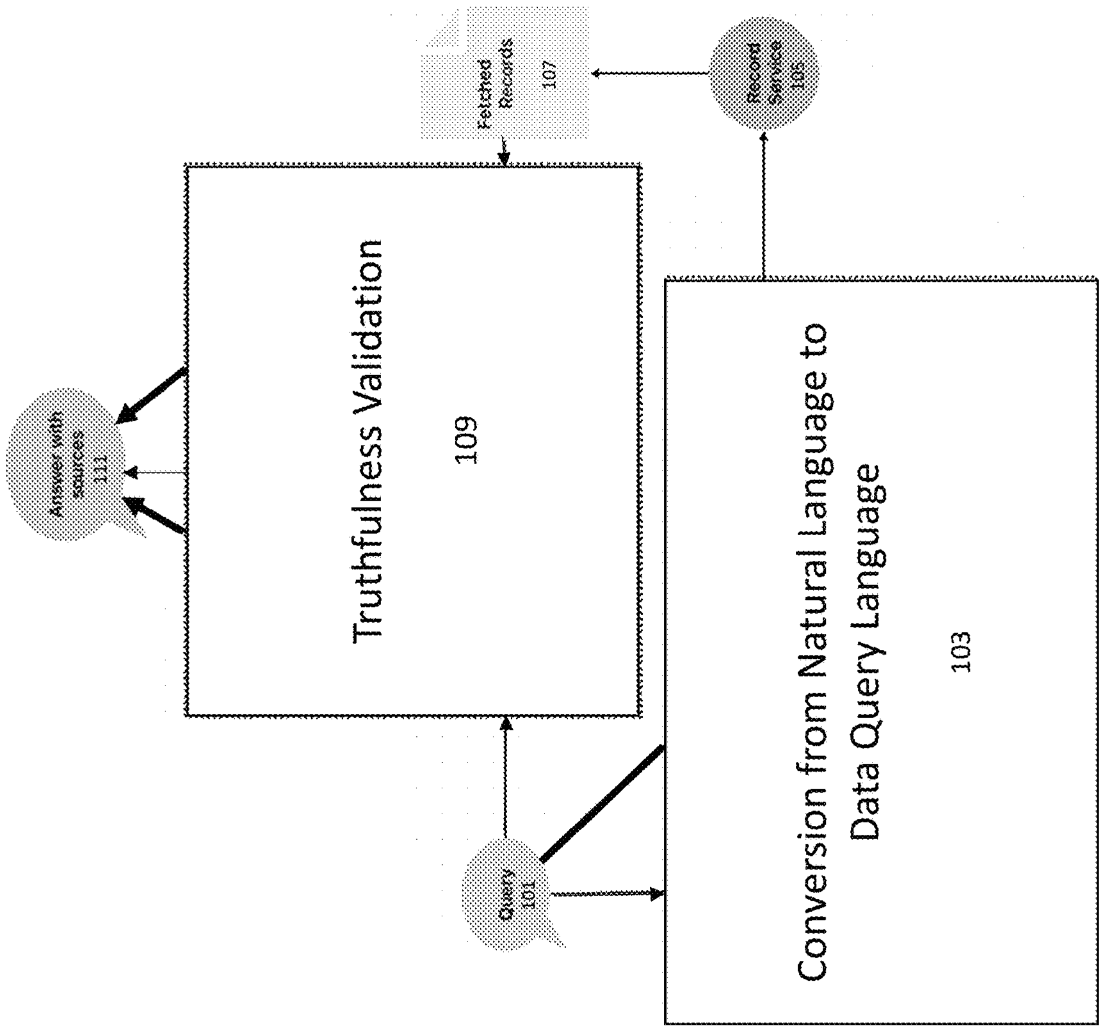
FIG. 1 illustrates an example system for grounding large language models using real-time content feeds and reference data, in accordance with various example implementations of this disclosure.

An artificial intelligence (AI) machine cannot evaluate a hallucination score on an answer that it generates. As disclosed herein, hallucination evaluation requires a reference (e.g., ground truth) to compare the generated answer to and determine a likelihood that the generated answer satisfies a number of criteria. The criteria may comprise, for example, whether the generated answer contains information that is not present in the reference but is presented as if it were true. Comparing the generated answer to external knowledge or data is beyond the capabilities of a text-based AI model like ChatGPT.

Hallucination evaluation requires context understanding, making it difficult for an automated system to provide accurate hallucination scores. This disclosure leverages natural language processing (NLP), real-time content feeds and large reference databases for automated hallucination detection.

This disclosure provides a system and method for grounding large language models (LLMs) using real-time content feeds and reference data. An LLM is a type of AI that is trained on large amounts of text data and can generate new text based on that training. It is a broad term that encompasses a variety of models, including those used for natural language (NL) generation.

Unlike software code or data queries, NL has infinitely more ambiguities. Current LLMs may generate results that sound believable, but may not be truthful. By using a source of verified data, the disclosed system and method is operable to identify the types of queries or prompts that are likely to lead to answers based on outdated data or misrepresentation. This disclosure describes the process for adding in and knowing when to add in goals, tasks, subtasks, and reference data for human language and reasoning.

While LLMs are able to generate believable answers, some types of prompts result in believable, but non-truthful answers. These type of prompts may be identified through the identification of similar tasks and the recognition of relevance to reference data. The disclosed system and method adds natural language processing (NLP) to recognize a bad LLM or the wrong LLM and use a different LLM.

The disclosed system and method leverages a service for real-time content feeds (e.g., up-to-the-minute news articles) and a highly accurate reference data (e.g., corporate hierarchies, ownership, employees, competitors, suppliers, customers. This service is made available to a LLM learning model to improve the truthfulness and accuracy of any results that it returns.

NLP-based LLMs are often trained on a very large set of data. Training a model is very compute intensive and may take hundreds or thousands of specialized machines hours, days or weeks depending on the size of the training data. These models are not aware of current events or authoritative information that is not in their training data. One approach to overcome this is to build a fine-tuning model on top of the base model that is aware of the most up-to-date information. The disclosed system, however, comprises an ensemble of models that can leverage real-time content or reference data such that the system can identify when a prompt needs to be rewritten to provide a more precise request, when a prompt requires augmentation of data, or when a result needs to be corrected with either. The disclosed system processes the real-time data and reference data while using these models. In addition, the disclosed system comprise a process for determining when the models are needed, including generating queries and sub-queries, identifying similar goals to other queries, generating subgoals to be solved by the system itself or other agents like humans or other automated software systems, and the ability to rewrite results or sub-results using augmented data.

The disclosed system uses vector storage, real-time information and reference data. The disclosed system has the ability to rework prompts and results with newly generated queries and sub-queries, as well as define goals and subgoals to help solve the request. The disclosed system uses NLP to determine when and if queries, goals, and external data should be used.

As LLMs become increasingly powerful, there arises a significant concern regarding the generation of inaccurate or false information. LLMs are susceptible to a phenomenon known as "hallucination," where they generate text that appears plausible but lacks factual basis or is entirely fabricated. An LLM hallucination is a generation of an output that looks, sounds, or reads as plausible, but is either factually incorrect or unrelated to the given query or context of the user's prompting.

The problem of hallucination arises due to the nature of LLMs, which are trained on vast amounts of text data to learn patterns, grammar, and context. While LLMs excel at generating coherent and contextually appropriate responses, they lack a comprehensive understanding of the real world and the ability to verify the accuracy of the information they produce.

A Generative Pre-trained Transformer (GPT) is approachable in that it seems to understand the intention behind a user's question or query and creates believable answers. Because LLMs are trained on massive amounts of data, it relies on the statistical frequency and spatial closeness ("proximity") of words and concepts to string together NL answers. While this might be fine for looking up product features for shopping, or places to eat, the LLM may not recognize that a product is out of stock or a restaurant has been closed down temporarily or permanently. Some types of medical or legal advice that doesn't change too often and has similar answers might be appropriate for LLMs. However, the risk that an LLM system can generate something that may not be true is pretty high. The uncertainty of not knowing whether the information is accurate or not (for the user's specific situation) may influence a user's decision. Likewise, the issue of algorithmic liability (where an LLM creator could get sued for untruthful data, distrust of the system, or other ethical concerns about bias or hurtful information) can cause issues for both the developers and users. Accordingly, the disclosed system and method are more critical than just correcting or mitigating hallucinations caused by lack of proper weighting of current information.

Hallucinations may be reduced by improving the training data. However, it may be costly to ensure data is clean, ensure data has a critical mass for all uses and spend the time and resources launching a new model Hallucinations may be reduced by pre or post filtering prompts and results to eliminate certain types of questions known to give reliably wrong answers.

Hallucinations may be reduced by adversarial testing. AI designers, data scientists and developers may create smaller, more nimble AI models that are known to be more accurate as a means to test the inputs and outputs of larger LLM models.

Understanding, also known as "explainability," is useful for both AI developers and end users to understand why an LLM gave the answer that it did. Knowing the context and why an LLM answered the way it did may help the end user recognize when something believable is actually contextually false. For example, knowing the difference between tire inflation, economic inflation and tire price inflation may help a user recognize that an "inflation" answer was used incorrectly and not valid.

Also, the inherent nature of pre-training LLMs limits their knowledge of real-time events, time-sensitive information, and dynamically changing contexts. As a result, when faced with queries that involve time-related constraints, LLMs may generate responses that are outdated or inaccurate. This phenomenon poses a challenge in applications where up-to-date information is crucial, especially in cases where current information contradicts historical facts or may carry more weight than training data.

The generation of inaccurate information can have severe consequences for individuals and organizations when making decisions based on unreliable outputs. Consequently, there is a need to develop techniques and methodologies to mitigate this issue and ensure the generation of truthful responses by LLM search-based systems.

LLM-based search systems may comprise an augmented search system, such as BingGPT. In the augmented search system, users type in questions or queries which are first filtered through a GPT NLP system to infer the intention and meaning of the query as a means to explicitly or implicitly submit the query. The LLM may be used at different stages of a pipeline. For example, the LLM may be used in between the user's query and the search engine query or after the query results from the search engine to summarize, cleanup, augment or improve the results that the search engine returned.

The alternative to the augmented search system the use of an LLM as a search engine itself. This may have better results for some types of information, but lacks the up to date information that the augmented search system may provide. The use of an LLM as a search engine also requires more computing, data and work to keep up to date. Both approaches may only return the most highly ranked search results or the most statistically correlated information. To generate more exhaustive results, users may craft increasingly sophisticated search queries which LLM can help with. To get more truthful and up to date results, LLMs need a concept of recency and importance. Search engines may provide more real-time data.

This disclosure describes a system and method for handling NL queries, retrieving relevant information from a database and validating generated answers. The system and method leverage recursive calls to LLMs with specialized prompts and employs vector embeddings to improve the accuracy of information retrieval tasks.

FIG. 1 illustrates an example system for grounding LLMs using real-time content feeds and reference data, in accordance with various example implementations of this disclosure. The system receives an NL query 101 and generates an answer with sources 111. A first subsystem 103 performs the process of converting NL queries into structured data queries to generate a call to a record service 105 that returns fetched records 107. A second subsystem 109 receives the query 101 and the fetched records 107 and performs a similarity-based truthfulness validation to generate the answer with sources 111.

The query 101 is a question or information request written in NL. The query 101 may come from user input or any automated source. The conversion from NL to data query language (DQL) 103 interprets the NL query 101 to generate structured data querying of a record service 105. The system is able to determine when LLMs will fail and become hallucinatory according to similarity-based validation 109, high-precision reference data 107 accessed through agent workflows 105. A hallucination score is also generated to enhances the reliability of the LLMs according to factors comprising the entities involved, the context, related materials and the model's awareness of new information.

The query 101 is a prompt that comprises the first input given to a language model. The query 101 may comprise questions, tasks, instructions or a series of answers and responses either by the user or by another system. A prompt template may contain instructions to guide the language model, a set of few-shot examples to help the language model generate a better response and/or specific questions directed at the language model.

The record service 105 is the data feed service provided to be queried. The record service 105 may comprise textual content with metadata (e.g., any kind of tags or information about the textual content). The system pulls relevant records 107 from record service 105 using the specific query language provided by the conversion from NL to DQL 103. Required attributes of this query language may comprise text fields (one or more fields containing textual data to be searchable), metadata and clusters.

Figure 2:
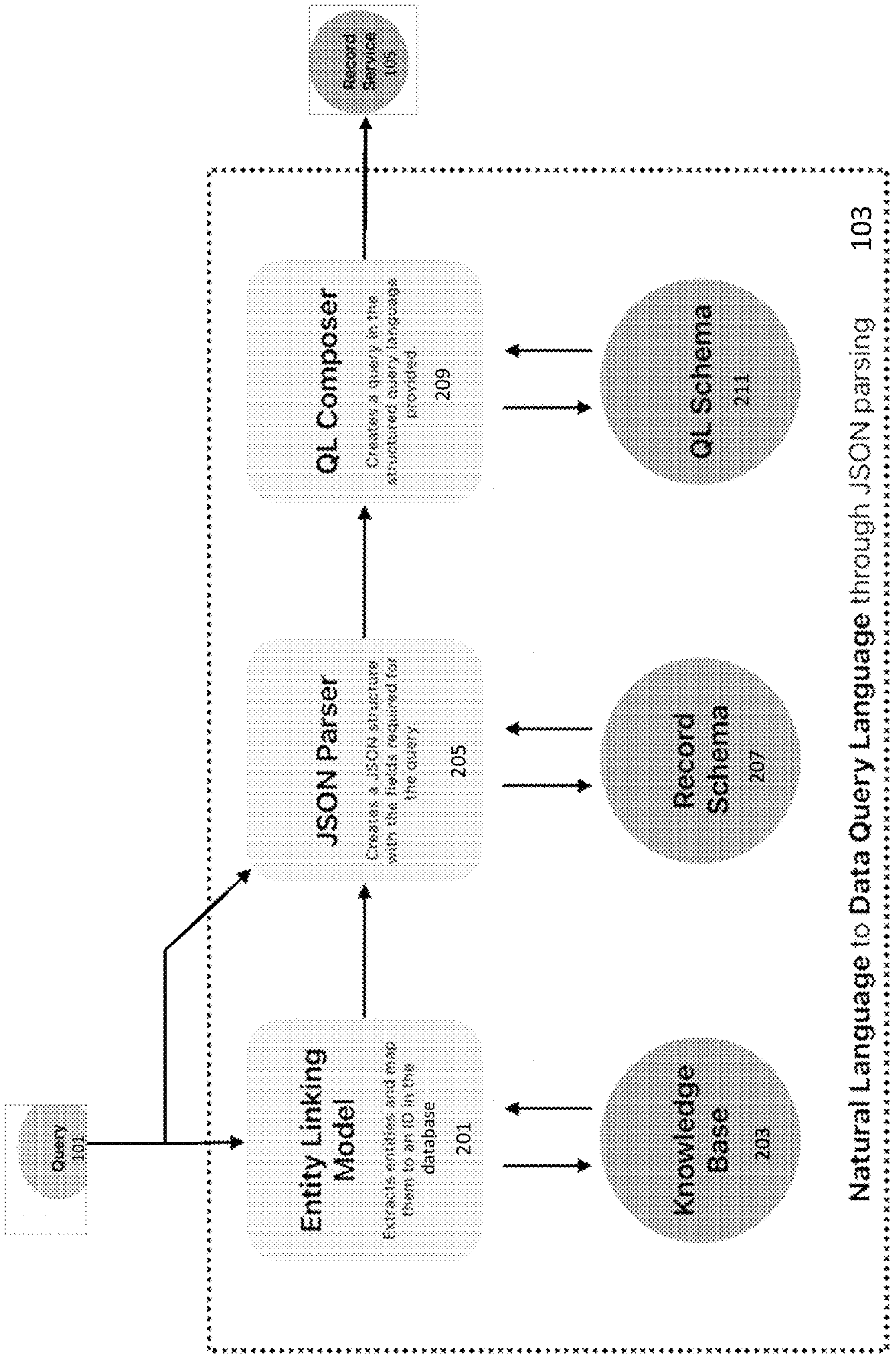
FIG. 2 illustrates an example subsystem for conversion from natural language to data query language, in accordance with various example implementations of this disclosure.

FIG. 2 illustrates an example subsystem for conversion from NL to DQL 103, in accordance with various example implementations of this disclosure.

Data Query Language (DQL) is a type of computer language that is used to request and manipulate data in databases and information systems. VQL is the Bitvore Query Language ('vore). It has a specific query grammar similar to other query languages used in databases, big data stores, or vector stores (columnar or row-based etc). Other query languages that are commonly used include Cypher (graph databases), SparkQL (big data stores), SQL (structured query language for relational databases), etc.

JavaScript Object Notation (JSON) is a data-exchange format that makes it possible to transfer populated data structures from any language to formats that are recognizable by other languages and platforms. JSON is popular as a data format for developers because of its human-readable text, which is lightweight, requires less coding, and processes faster. JSON parsing is the process of converting a JSON object in text format to a Javascript object that can be used inside a program.

The NL to DQL converter 103 generates structured data from unstructured text using LLMs by starting from a NL query and formulating a JSON structure automatically, taking into consideration the important fields to be addressed by itself.

The NL to DQL converter 103 generates database queries by leveraging a prompted LLM to process input JSON and incorporate time constraints into the search process. For that, the system must to learn the data query structure through the prompted LLM sequence, being able to properly convert the JSON into almost any DQL. This system is implemented by applying a prompted LLM to constrain the output generations of the language model so that it avoids hallucination.

The data components in the flow, such as databases and data sets, serve as placeholders to data components with the same structure, and as long as the required attributes for each one is attended, the pipeline as a whole should remain functional.

The process initiates with the transmission of a NL query 101 to the entity linking model 201. The entity linking model 201 identifies relevant entities and associates them with specific identifiers within the database 203. The entity linking model 201 is an LLM-based named entity recognition (NER) system that is specifically designed to extract organization names from a given text. The system uses a series of prompted LLMs with multiple tasks, including entity recognition, entity classification and ID mapping. The entity linking model 201 receives the query 101 and communicates with a database 203 to generate an input to a JSON parser 205.

The database 203 comprises a specific set of reference data, such as IDs for entities, to map entities to identifiers. The database 203 accepts any unique identifier system for entity types. The system use the reference data of the database 203 to map named entities to their unique identifiers, regardless of the specific entity type or the particular set of identifiers used. Required attributes of the reference data in the database 203 may comprise entity names, entity types and entity identifiers. By replacing these specific components with more abstract, adaptable versions, the system may be more generalizable. The entity linking model 201 may work with any set of reference data, structure data in any user-defined format and retrieve data from any compatible data service 105, making it flexible and adaptable to a wide range of use cases.

In order to address the distinction between current information and past information, a prompted LLM is purposefully engineered to incorporate time constraints into the search process. This ensures the accurate formulation of dates based on the original query 101, thereby accommodating temporal considerations.

The query 101, together with the associated entities, is then forwarded to the JSON parser 205. The JSON parser 205 performs a series of recursive calls to a prompted LLM that utilizes a record schema 207 to generate a JSON structure (or any other machine processable intermediate structured or semi-structured format) incorporating the necessary fields to fetch relevant records to the original query 101.

The JSON parser 205 receives the query 101 along with the output of the entity linking model 201 and communicates with a record schema 207 to generate an input to a QL composer 209. The JSON parser 205 generates a structured JSON object from unstructured textual data. The series of recursive calls use the output of one call as the input to the next, thereby validating each generation step. The JSON parser 205 is designed to process the input text 101 and generate relevant fields to be queried further on.

The record schema 207 is a conceptual representation of how the textual data feed is organized and related in the database (i.e., record service 105). Required attributes of the textual data feed may comprise tags, fields, value types and value examples per tags.

The query language (QL) composer 209 generates queries to retrieve records 107 from a database 105, based on the provided QL schema 211 and the output from the JSON parser 205. The QL composer 209 leverages a prompted LLM to process the input JSON.

The task of the QL composer 209 is to understand the JSON data, extract relevant keywords and phrases and structure them into a query. This involves reading examples and documentation of the QL to understand the context, which enables the generation of accurate and efficient database queries. The JSON structure is transferred to the QL composer 209, which formulates a data query by employing the QL schema 211 (DQL rules, samples, and documentation). This query is sent to the record service 105, filtering records containing textual data with metadata tags.

The NL to DQL converter 103 integrates several advanced technologies with specific ways to prompt and constraint LLMs in a way to interpret NL queries, link them to known entities and generate structured data queries, working as a translator from NL to a structured DQL. The record schema 207 is configured to prompt an LLM to generate a JSON structure for database querying. Interpreting NL queries 101 and retrieving relevant information 107 from a database 105 requires a deep understanding of LLMs, prompt engineering and entity linking, making the solution non-trivial for specialists in the area.

The NL to DQL converter 103 automates the complex task of interpreting natural language queries, generating structured data queries, and retrieving relevant information from a database. This process could be used in various applications, such as information retrieval, customer service, data analytics and many more.

The NL to DQL converter 103 may be applied in various industries and fields where there's a need to interpret NL queries 101 and retrieve relevant data 107 from a database 105. The disclosed system is applicable to any situation where an NL interface to a structured database 105 is required as long as the data components 203, 207 and 211 are available.

Figure 3:
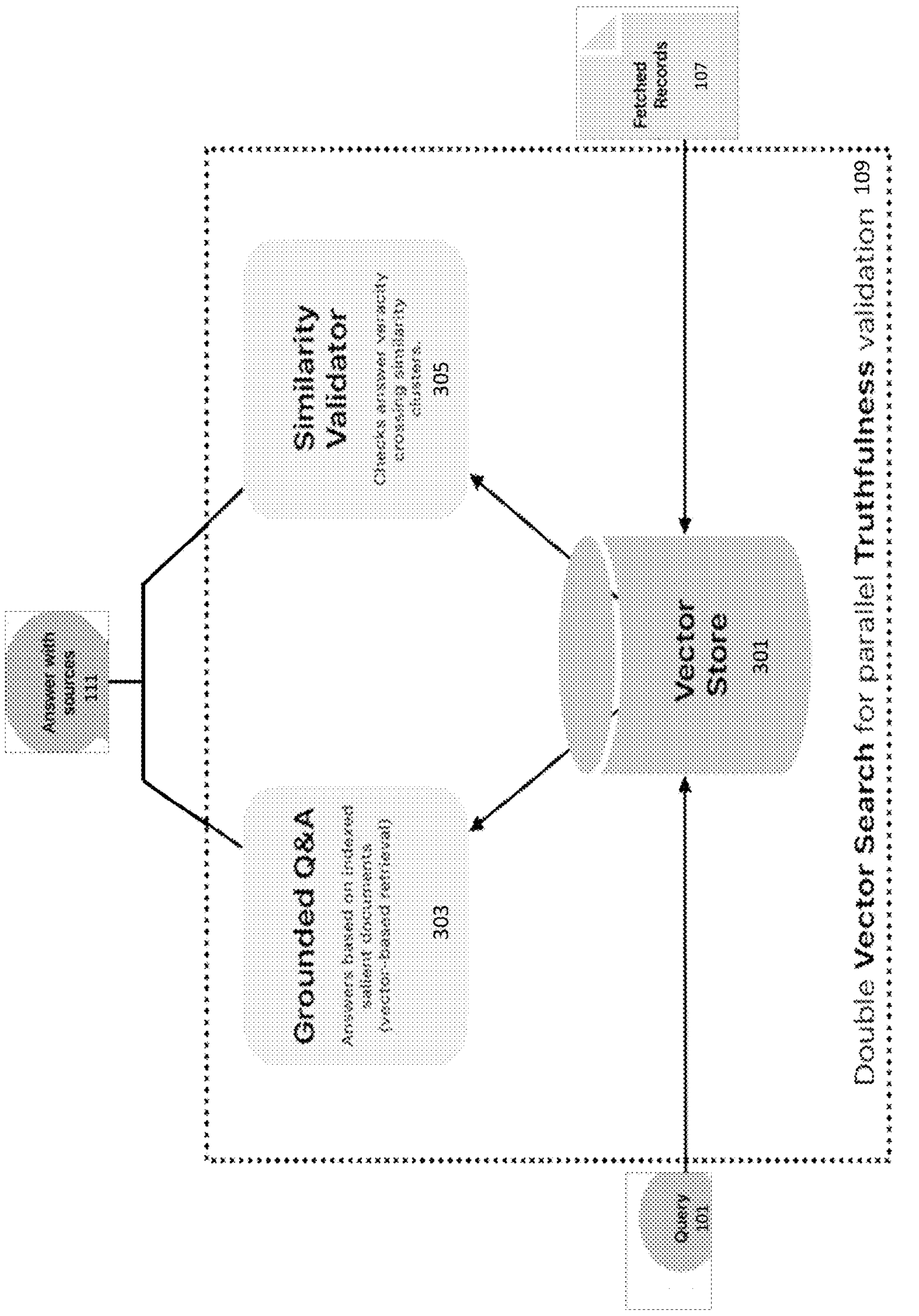
FIG. 3 illustrates an example subsystem for truthfulness validation, in accordance with various example implementations of this disclosure.

FIG. 3 illustrates an example subsystem 109 for truthfulness validation via a double vector search, in accordance with various example implementations of this disclosure.

The truthfulness validator 109 comprises a vector store 301, a grounded Q&A 303 and a similarity validator 305 for cross-verifying the reliability and accuracy of system-generated answers 111. Through confirmation of answer consistency with the content of semantically similar documents 107, the similarity validator 305 enhances the overall quality and trustworthiness of the system's outputs 111, proposing a confidence score (or a hallucination score) to the final answer 111.

The vector store 301 is a data structure that stores vectors, which are embeddings of text or other data. The vector store 301 allows for efficient similarity searches and other operations. Via vectorization and document embeddings, a "document vector" may be generated according to the analysis of relevant documents 107. The document vector is stored in a data store 301. COSINE similarity may be used for vector index retrieval.

The grounded Q&A 303 leverages an LLM to generate responses based on the user's original query 101 and documents 107 retrieved by the system. This multi-step process involves the evaluation of documents 107, extraction of salient phrases and the construction of a coherent response.

This system employs a vector-based similarity search 305 to retrieve parts of the documents that are semantically related to the input query. These parts are then used by a recursive LLM prompt process to construct a final answer.

The similarity validator 305 is operable to verify the accuracy of system-generated answers 111 by evaluating their similarity to a cluster of semantically related documents 107.

In the same way that records 107 are vectorized and compared to the query 101 for the LLM 303 to answer 111, each record's clusters 107 are also vectorized to generate a second answer. These two answers are finally compared, and a degree of similarity between them serves to calculate a hallucination score.

The collected records 107 are embedded with the LLM model's hidden layer in combination with TF-GDF vectors generated from the extracted entities. These vectors are stored in the vector store 301 to be further used by the subsequent components. The initial query 101 is also vectorized in the process.

In the vector store 301, retrieval is based on the concept of vector space models where each item in the store is represented as a vector in a multi-dimensional space. The cosine distance between the query vector and each item vector in the store is calculated and used as a measure of similarity.

The grounded Q&A system 303 uses the most prominent parts of documents (retrieved from the vector store 301) to respond to the original query 101.

The similarity validator 305 looks for similarity clusters of the retrieved records 107 and the Q&A process 303 is repeated using similar records (not the originally retrieved ones) as secondary validators. The truthfulness validator 109 cross-checks answers obtained from the main records with those from the similarity clusters and creates a hallucination score based on the inverse of the similarity between the 2 answers.

The output of the truthfulness validator 109 is an answer 111 to the original query 101 with metadata. The answer 111 is a detailed answer to the initial query 101, grounded in the documents 107 fetched from the data service 105, including extracted sources and offsets from where the information was extracted, as well as a hallucination score for truthfulness.

The truthfulness validator 109 leverages vector embedding of records and queries, similarity-based validation and LLM response hallucination scoring. The truthfulness validator 109 uses of similarity clusters as secondary validators. This uses semantic similarity techniques (from similar prompted LLM vectors) to cross-check and validate the answers.

The truthfulness validator 109 validates responses and provides hallucination scores. This process requires a deep understanding of LLMs, vector embeddings, and semantic similarity techniques, making the solution non-trivial for someone skilled in the area.

The truthfulness validator 109 is applicable to any situation where a NL interface 101 to a structured database 105 is required and where the validity of the responses 111 is crucial.

This disclosure is operable to regenerate a prompt according to grounded data. The prompt may comprise queries, sub-queries, goals and sub-goals. The prompt may be bounded by giving the LLM a list of guidelines or guardrails that the LLM is not allowed to do automatically, implicitly or explicitly.

The analysis of generated answers/results is performed using similarity, entity extraction, sentiment, or hallucination score to determine if changes to the prompt are needed. The generated answers/results may be rewritten, reformatted, and regenerated. Re-querying, regeneration, generating goals and sub-goals as inputs to internal or external systems may require humans or other LLM calls itself. Analysis of results uses similarity, entity extraction, sentiment, or hallucination scores to determine if changes are needed. This analysis may comprise the processing of unstructured text, retrieving relevant data, generating well-referenced answers to complex queries, extracting insights from large volumes of unstructured data, and validating the accuracy of responses.

An example query 101 may be "Did SVB file for bankruptcy this year?" A traditional LLM may answer, "No, SVB (Silicon Valley Bank) did not file for bankruptcy this year."

An example JSON parser 205 output according to the example query 101 may comprise {'title': 'SVB Bankruptcy', 'signal': 'Bankruptcy', 'timestamp': 'Jan. 1, 2023.00:00:00-05/15/2023.23:59:59', 'orgs_article_bvid': ['b00001gkr']}. An example QL composer 209 output may comprise '+title:SVB +signal:Bankruptcy +(orgs_article_bvid:b00001gkr) +timestamp:{Jan. 1, 2023.00:00:00-05/15/23.23:59:59}' The record service may fetch 148 records 107. A cluster similarity may be 0.78. The final answer 111 may be "Yes, SVB filed for bankruptcy this year under Chapter 11 protection" with sources listed.

The output of the QL composer 209 may comprise a query formatted as VQL (i.e., a Bitvore query language). However, the QL composer 209 may generate an output in any QL as long as the QL schema 211 is provided.

The hallucination provided here is an example of hallucination involving time stamps but this is not intended to be limiting and the method described herein can be applied to other kinds of hallucinations. While the original query is text, other parts of the method can be applied to generative AI for images, video, or audio.

Few shot examples are prompts for AI models that include a few examples of what the system is supposed to accomplish. Traditionally for machine learning, AI models required hundreds or thousands of examples to accomplish high quality outputs (precision, recall). Few shot learning allows a user to seed the answer with similar queries. Statistically an LLM could determine the relationships between the query examples and the types, length, and type of language. Zero-shot or one-shot examples rely on disambiguation solely based on the context of the prompt.

By replacing these specific components with more abstract, adaptable versions, the system could be made more generalizable. It would be capable of working with any set of reference data, structuring data in any user-defined format, and retrieving data from any compatible data service, making it flexible and adaptable to a wide range of use cases.

If the hallucination score is above a certain number, the response generated by the system will be flagged as potential misinformation and a system administrator or other party can be notified and the user can be blocked from using the system to prevent spread of misinformation. The hallucination score may be combined with a composite sentiment score for further refinement of the misinformation threshold.

Trusted or trustworthy AI is that all best practices have been employed in the selection of the training data, use of technologies, and include accommodations for accuracy, explainability, privacy and reliability. A user trusts the system to follow a reasonable process to give the best answers with available information and controls. These types of systems are efficient at adhering to strategic goals for how and why the AI system was design and also are designed to efficiently use limited time, resources or information.

Truthful AI describes a system that is effective at reaching an objectively verifiable answer given enough time, resources, or information. Truthful AI overlaps with trustworthy AI in that increasing the validation and verification of results may also increase the trustworthiness of the system, data, and processes.

A null case is a simple or smallest example that demonstrates the behavior. For instance, a LLM that has only been trained up until Jan. 1, 2021 may return many different answers if you ask "What is today's date?" or "Who is the current governor?" etc. Large language models have a reasoning problem—not just about time or temporal things—but maintaining a logical consistency across their data and answers. By detecting user queries and language related to goal-based objectives, changing data, or logical reasoning (inference, deductive, adductive, analogical, cause and effect, decompositional) and breaking them down into thought patterns and non-LLM augmented tasks, the truthfulness of their answers can be cross-checked. For Bitvore this means building up a set of the simplest queries that induce hallucinogenic LLM answers and generalizing them.

Attention is a filtering method that allows large language models to differentiate when similar things are used in different contexts. As a simple example: I tear the page. I shed a tear. Attention models will decide which concept is being used based on the importance of different elements statistically related to the actual input.

Figure 4:
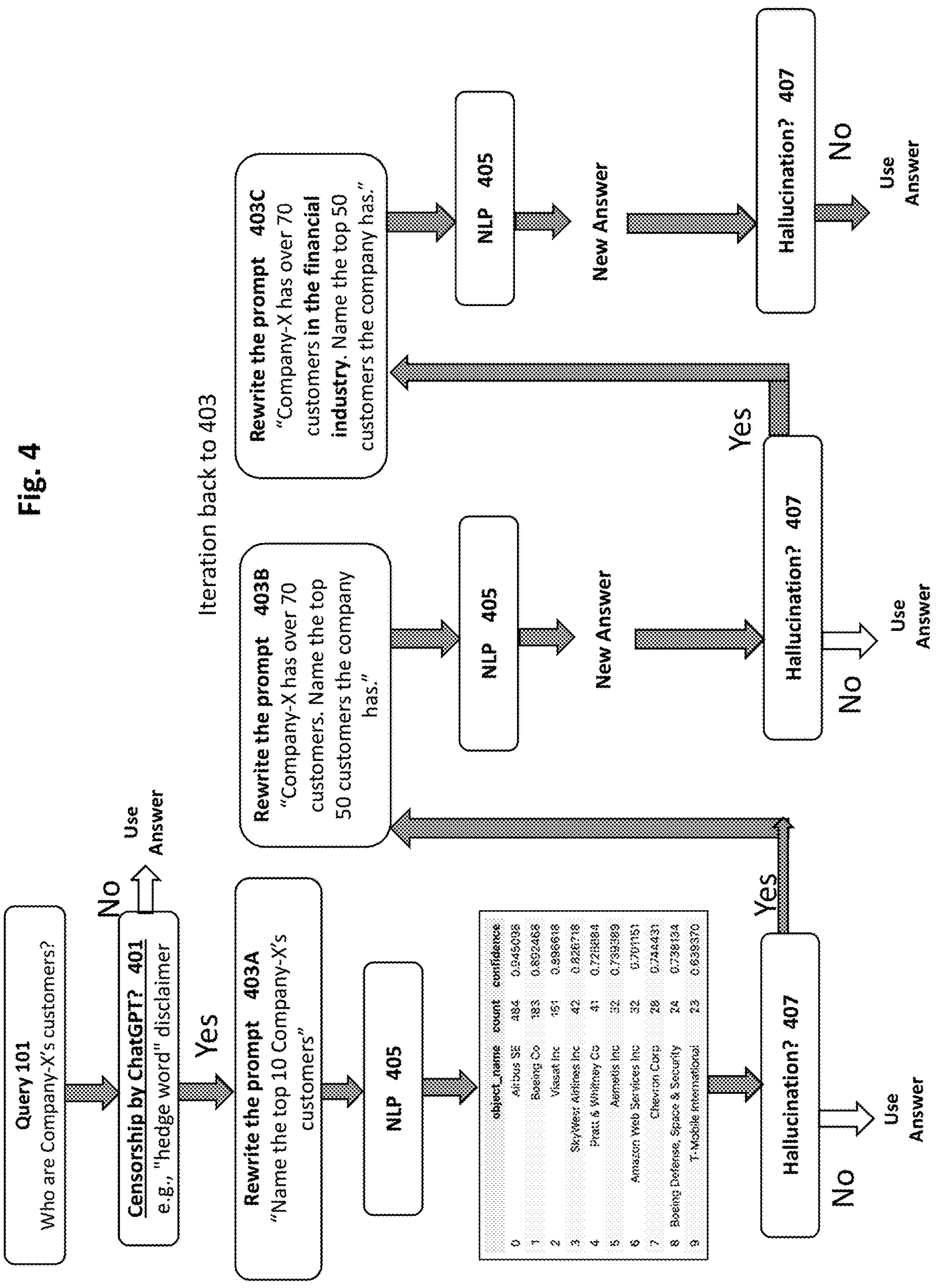
FIG. 4 illustrates an example prototype for grounding large language models using real-time content feeds and reference data, in accordance with various example implementations of this disclosure.

FIG. 4 illustrates an example prototype for grounding large language models using real-time content feeds and reference data, in accordance with various example implementations of this disclosure.

As an example, given the following prompt 101, "Who are Company-X's customers?," there would be a high similarity score to other known hallucination prompts using the vector data we have. Because it generates a "hedge word" disclaimer, we can automatically score it as likely to be a hallucination and take all NLP parsing and entity parsing of the results with a lot of distrust. One example of a high scoring hallucination includes similarity to this text: "Please note that the information provided here is based on my knowledge as of September 2021, and there may have been developments or changes related to Company-X or its services since then." Even with the above disclaimer, it got 100% of the questions wrong.

Also, we can extract Company-X as a company entity with salience and extraction confidence. These are data points we use to determine whether or not to rewrite the prompt at 403A into something that has a lower hallucination prediction—for example, "Name the top 10 Company-X customers." This has a high similarity score to other known prompts that may be asked of the data that return more specific results.

From the NLP 405, "Name the top 10 Company-X customers" is declarative and has a corporate entity and an action resulting in a lower hallucination prediction. However, at 407, the answer to "Name the top 10 Company-X customers" is completely wrong.

Accordingly, the process iterates back to rewriting the prompt 403B to give an even lower hallucination prediction based on analysis we've done. For example, the prompt rewrite is "Company-X has over 70 customers. Name the top 50 customers the company has." The NLP 405 shows Company-X with all the metrics (salience, sentiment, confidence) and the co-reference. "The company"=Company-X. It then generates the following partially correct hallucination.

One more final prompt re-write 403C can make it even better, but it still contains hallucinations. For example, "Company-X has over 70 customers in the financial industry. Name the top 50 customers the company has." We now have two verifiable company references, an industry filter, a declarative, etc. This has a much, much lower hallucination prediction score because we can use our NLP 405 and reference data to figure out if there's high enough salience, extraction confidence, and cross-reference points in the massive amounts of analyzed unstructured data we have access to in the existing system including relationships and co-frequencies of topics and terms. That's about as far as we can change prompts. Now we start analyzing the results.

For each company, we access the reference data, figure out the industry, and then find all the relationships. For each value the LLM returns, we can extract the company name regardless of whether it's in a list or unstructured text. We pull each company name out with a salience and extraction confidence (and even per mention sentiment), score it against our reference data, and then see how many relationships data points we have in the system and beginning from what time. All our data has timestamps, so they can be time ordered. We also have 14 different relationships we use to cross-verify any of our NLP extracted entities, scores, or relationships. If we find zero or a very low number of X is-a-customer-of Company-X or the company entity is not in the industry, we score that mention as a hallucination. If we find an example like Big-Customer-Y is-a-customer-of Company-X, then we see that relationship a dozen times, Big-Customer-Y is in the industry, and there are co-frequent mentions, then that scores as a very low hallucination. We take all the salience from each and roll the scores up to get a per mention hallucination score and a total record hallucination score similar to how we do sentiment.

For generating the scores 407, prompt the reference with, for example, "You are a truthfulness validator. Your goal is to validate if an auto-generated answer is correct or accurate based on a series of factors, attributing a Boolean label for each of these factors. True means the answer passes that criterion. False means it does not." Example criterion may comprise: "Is the answer purely based on the source?" and/or "Is the answer time accurate?" They don't just have to be Boolean, they may also be discrete, i.e. on a scale from 0.0 to 1.0 or adjusted to any range, and they can leverage an ensemble of AI models or their own workflows themselves recursively.

With the answer the NLP 405 gave, we can generate a new answer based on using our reference data and vector data analysis across all billions of data points. In this case, for instance, we rewrite to include a list of "high confidence", "possible", and "not likely" or we want to label or just not included things with low scores based on sorting the hallucination scores.

For re-writing the prompt 403 (e.g., 403A, 403B, 403C), ask the reference, for example, "Do you think the answer properly addresses the question? If not, what would be a better way to ask the question?" The evaluation workflow can be any number of AI models, not just an LLM, that are evaluated in concert and rolled up in multiple different ways.

The disclosed system is not just a recursive call to an LLM that re-engineers the prompt or results to be more truthful based on a hallucination score. The disclosed system may be any number of human, automated, AI model steps as specified in a workflow. As used herein, by way of example and not limitation, a database or the reference database(s) may be any type of relational, graph, columnar, etc. Data stored may comprise vector data for text analysis and similarity using natural language processing (NLP). Multiple databases may be used. A datastore for storing the timestamped records and raw text with their tagged values may comprise any of the metrics disclosed (e.g., sentiment, salience, extraction confidence, etc.). An example database may store reference data and metadata about entities (e.g., companies or people). Another example database may store relationships (e.g., both a graph database and a relational database). Additionally, a vector store database may comprise generated prompts, results, and scoring on them. Also, each sub-step and/or recursive step may comprise any number of steps that include inputting and outputting. Inputting and outputting may comprise a workflow where individual steps and the order they are performed are done by different components such as an LLM, rules-based or heuristic systems, automated or manual prompt engineering and re-engineering, or access to reference data or computed scores.

Additional detail may be found in Appendix A.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A computing system:

one or more processors;

a reference database comprising real-time content feeds and structured reference data; and one or more non-transitory computer-readable media that collectively store instructions that, when executed by the one or more processors, cause the computing system to perform operations, the operations comprising:

receiving an initial query;

processing the initial query with an artificial intelligence (AI) model selected from an ensemble of language models to generate an output;

generating a plurality of metrics by comparing the output to the reference database according to a plurality of truthfulness and recency criterion;

determining a hallucination score according to an evaluation of the plurality of metrics; and performing recursive prompt engineering by dynamically modifying the initial query to reduce the hallucination score, wherein:

the modification is based on an evaluation function that analyzes prior hallucination scores, entity salience, entity extraction confidence, similarity validation, and structural prompt components derived from prior iterations, the evaluation function generates the modification before reprocessing the modified query with the selected AI model, and the recursive prompt engineering selectively adjusts identified subcomponents of the initial query corresponding to entities, temporal constraints, or task objectives based on the analysis without full regeneration of the prompt, wherein the recursive prompt engineering preserves remaining portions of the initial query that are not selected for adjustment.

2. The computing system of claim 1, wherein the operations comprise:

rewriting the initial query to generate a new query having constrained entity references or temporal parameters;

processing the new query with the AI model to generate a new output;

generating a plurality of new metrics by comparing the new output to the reference database according to the plurality of criterion; and determining a new hallucination score according to an evaluation of the plurality of new metrics.

3. The computing system of claim 2, wherein the new query is generated as a function of a reduction target associated with the hallucination score.

4. The computing system of claim 2, wherein the operations comprise:

iteratively performing the rewriting, the processing, the generating, and the determining until the hallucination score satisfies a truthfulness threshold derived from the reference database or until successive recursive prompt modifications no longer reduce the hallucination score.

5. The computing system of claim 3, wherein the hallucination score or the new hallucination score is acceptable as compared to a threshold.

6. The computing system of claim 1, wherein the operations comprise:

providing a user interface configured to receive a new query according to the hallucination score.

7. The computing system of claim 6, wherein the operations comprise:

processing the new query with the AI model to generate a new output;

generating a plurality of new metrics by comparing the new output to the reference database according to the plurality of criterion; and determining a new hallucination score according to an evaluation of the plurality of new metrics.

8. The computing system of claim 7, wherein the operations comprise:

iteratively performing the rewriting, the processing, the generating, and the determining until the hallucination score or the new hallucination score is acceptable.

9. The computing system of claim 8, wherein the hallucination score or the new hallucination score is acceptable as compared to a threshold.

10. The computing system of claim 1, wherein the operations comprise:

providing a user interface configured to allow a user to change the output according to the hallucination score.

11. The computing system of claim 10, wherein the operations comprise:

generating a new query according to the hallucination score and the changed output.

12. The computing system of claim 11, wherein the operations comprise:

processing the new query with the AI model to generate a new output;

generating a plurality of new metrics by comparing the new output to the reference database according to the plurality of criterion; and determining a new hallucination score according to an evaluation of the plurality of new metrics.

13. The computing system of claim 12, wherein the operations comprise:

iteratively performing the rewriting, the processing, the generating, and the determining until the hallucination score or the new hallucination score is acceptable.

14. The computing system of claim 13, wherein the hallucination score or the new hallucination score is acceptable as compared to a threshold.

15. The computing system of claim 1, wherein the AI model is a large language model (LLM).

16. The computing system of claim 1, wherein the reference database comprises is a real-time content feed.

17. A computing system:

one or more processors;

a first reference database comprising real-time content feeds; and one or more non-transitory computer-readable media that collectively store instructions that, when executed by the one or more processors, cause the computing system to perform operations, the operations comprising:

receiving an initial query;

processing the initial query with an artificial intelligence (AI) model to generate a first output;

inputting the first output into a system which contains a large language model (LLM) to generate a second output;

generating a plurality of metrics by comparing the second output to a second reference database according to a plurality of criterion;

determining a hallucination score according to an evaluation of the plurality of metrics; and performing recursive prompt engineering by dynamically modifying the initial query to reduce the hallucination score, wherein:

the modification is based on an evaluation function derived from prior iterations and similarity-based validation against clustered reference records using entity salience, entity extraction confidence, and hallucination scores, and the recursive prompt engineering selectively adjusts subcomponents of the initial query corresponding to entities, temporal constraints, or task objectives without full regeneration of the prompt while preserving remaining portions of the initial query that are not selected for adjustment.

18. The computing system of claim 1, wherein the operations comprise:

rewriting the initial query to generate a new query;

processing the new query with the AI model to generate a third output;

inputting the third output into the system which contains an LLM to generate a fourth output;

generating a plurality of new metrics by comparing the fourth output a third reference database according to the plurality of criterion; and determining a new hallucination score according to an evaluation of the plurality of new metrics.

* * * * *